US008370840B2

(12) United States Patent
Capek et al.

(10) Patent No.: US 8,370,840 B2
(45) Date of Patent: *Feb. 5, 2013

(54) APPARATUS AND METHODS FOR PERFORMING COMPUTER SYSTEM MAINTENANCE AND NOTIFICATION ACTIVITIES IN AN OPPORTUNISTIC MANNER

(75) Inventors: Peter G. Capek, Ossining, NY (US); Clifford A. Pickover, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 1069 days.

This patent is subject to a terminal disclaimer.

(21) Appl. No.: 12/055,362

(22) Filed: Mar. 26, 2008

(65) Prior Publication Data

US 2008/0178186 A1 Jul. 24, 2008

Related U.S. Application Data

(63) Continuation of application No. 11/143,289, filed on Jun. 1, 2005, now Pat. No. 7,814,490.

(60) Provisional application No. 60/618,925, filed on Oct. 14, 2004.

(51) Int. Cl.
  *G06F 9/46* (2006.01)
  *G06F 15/173* (2006.01)
  *G06F 3/048* (2006.01)

(52) U.S. Cl. ........ 718/102; 718/103; 718/104; 709/226; 715/867

(58) Field of Classification Search .............. 718/1–105; 709/223–226; 707/640, 649–654; 715/867

See application file for complete search history.

(56) References Cited

U.S. PATENT DOCUMENTS

| 5,012,409 A | 4/1991 | Fletcher et al. ............... 364/200 |
| 5,040,123 A | 8/1991 | Barber et al. ................ 700/100 |
| 5,263,154 A | 11/1993 | Eastridge et al. ................ 714/6 |

(Continued)

FOREIGN PATENT DOCUMENTS

| KR | 20010046167 A | 5/2001 |
| WO | WO 99/46660 | 9/1999 |

OTHER PUBLICATIONS

Hanako, N. et al., "Automatic Backup System," Patent Abstracts of Japan, Publication Date Feb. 2, 2000, Publication No. 2000035921 A.

*Primary Examiner* — Abdullah Al Kawsar (74) *Attorney, Agent, or Firm* — Harrington & Smith; Louis J. Perecello (57) ABSTRACT

The present invention concerns methods and apparatus for performing computer system maintenance and notification activities in an opportunistic manner during time periods identified by a user when the user expects not to be using the computer system. In methods and systems of the present invention, the user prioritizes computer system maintenance activities from high to low. When an opportunity arises to perform maintenance activities due to the user, for example, being away from the computer, the user specifies the length of time the user expects to be away from the computer using apparatus of the present invention. Methods of the present invention then initiate computer system maintenance activities beginning with the highest-priority maintenance activity that can be completed during the time period identified by the user. The method continues performing maintenance activities from highest to lowest priority for so long as there is enough time remaining to perform the next maintenance task. In the present invention notification activities using the computer system resource can be performed in an opportunistic manner. For example, in the present invention a user can specify a length of time the user expects to be away from the computer; during this period the computer system would automatically generate an "away from my desk" reply to anyone sending the user an e-mail.

43 Claims, 2 Drawing Sheets

U.S. PATENT DOCUMENTS

| | | |
|---|---|---|
| 5,455,946 A | 10/1995 | Mohan et al. .................. 707/202 |
| 5,555,371 A | 9/1996 | Duyanovich et al. ........... 714/13 |
| 5,821,854 A | 10/1998 | Dorinski et al. .............. 340/539 |
| 5,954,792 A | 9/1999 | Balarin ........................ 718/102 |
| 6,094,677 A | 7/2000 | Capek et al. ................. 709/219 |
| 6,112,225 A | 8/2000 | Kraft et al. ................... 709/202 |
| 6,134,653 A * | 10/2000 | Roy et al. ..................... 712/228 |
| 6,209,081 B1 | 3/2001 | Kahle et al. ................... 712/215 |
| 6,266,809 B1 | 7/2001 | Craig et al. ..................... 717/11 |
| 6,317,780 B1 * | 11/2001 | Cohn et al. ................... 709/217 |
| RE37,601 E | 3/2002 | Eastridge et al. ................ 714/6 |
| 6,360,336 B1 * | 3/2002 | Christensen et al. ........ 714/47.1 |
| 6,421,667 B1 | 7/2002 | Codd et al. ........................ 707/4 |
| 6,442,529 B1 | 8/2002 | Krishan et al. ............. 705/14.52 |
| 6,732,141 B2 | 5/2004 | Ellis ............................... 709/201 |
| 6,757,897 B1 | 6/2004 | Shi et al. ........................ 718/102 |
| 6,769,120 B1 * | 7/2004 | Rodriguez ..................... 718/100 |
| 6,964,048 B1 | 11/2005 | Isham ........................... 718/104 |
| 7,082,606 B2 * | 7/2006 | Wood et al. ................... 718/102 |
| 7,305,437 B2 | 12/2007 | Horvitz et al. ................ 709/204 |
| 7,499,715 B2 | 3/2009 | Carro et al. ................. 455/456.3 |
| 2003/0014491 A1 * | 1/2003 | Horvitz et al. ................ 709/206 |
| 2003/0084087 A1 * | 5/2003 | Berry ............................ 709/102 |
| 2003/0214657 A1 | 11/2003 | Stringham ..................... 358/1.1 |
| 2004/0093582 A1 | 5/2004 | Segura .......................... 717/102 |
| 2004/0249947 A1 * | 12/2004 | Novaes et al. ................ 709/226 |
| 2006/0026212 A1 * | 2/2006 | Tsukerman et al. .......... 707/200 |

\* cited by examiner

APPARATUS AND METHODS FOR PERFORMING COMPUTER SYSTEM MAINTENANCE AND NOTIFICATION ACTIVITIES IN AN OPPORTUNISTIC MANNER

CROSS REFERENCE TO RELATED APPLICATION

This application is a continuation of U.S. patent application Ser. No. 11/143,289 filed Jun. 1, 2005 (now U.S. Pat. No. 7,814,490) which claims priority to provisional U.S. Patent Application No. 60/618,925 filed on Oct. 14, 2004.

TECHNICAL FIELD

The present invention generally concerns methods and apparatus for performing computer system maintenance and notification activities, and more particularly concerns performing computer system maintenance and notification activities in an opportunistic manner during time periods when a user expects not to be using the computer system.

BACKGROUND

Modern computer systems, such as personal computers, require various maintenance tasks to be performed on a regular basis. These maintenance tasks include virus scanning, disk defragmentation, adware removal, database compaction, file backup, database encryption, updating of software installed on the computer, and rejuvenation or reinstallation of components of the operating system, or the operating system in its entirety, or performing a portion of a distributed computation. The software programs that perform these maintenance activities are often resource-intensive. Thus, user interactions with the computer are delayed and sluggish during periods when computer system maintenance activities are, for example, running in the background.

Nonetheless, such maintenance tasks are vital for keeping a computer free from viruses, adware, and other problems. Tasks such as compaction and defragmentation improve performance after they have been run, but make the machine very slow and sluggish while they are running. Users should not avoid performing maintenance tasks simply because they slow down a computer's operation while the tasks are being performed, but users often do so. In corporations, the information technology department will often require use of anti-virus or similar programs at a fixed weekly time, often making the machine unuseable during that interval.

Thus, it is seen that the state of the art is to schedule such tasks at a fixed time, say weekly, when the software is first installed in the system. Such a fixed time is never convenient for everyone, and is not even convenient for a particular user at the same time every week. In addition, the scheduled time is typically when a user is expected to be away from the system; for example, 10:00 PM on Friday night. This one-size-fits-all approach ignores the reality that often there is time even during business hours to accomplish important computer system maintenance tasks. The more frequently tasks are performed; the better an operating state will be achieved for a computer system. On the other hand, by not scheduling maintenance activities in an "opportunistic" manner when time slots for maintenance activities become available the productivity gains that can be achieved through more frequent performance of maintenance activities are sacrificed.

Thus, there is a need for a more flexible system that complements the regular scheduling of such background and maintenance tasks that initiates maintenance tasks when opportunities for such maintenance become available.

Methods and apparatus that would solve problems encountered in the art outlined thus far would likely have application in situations not typically thought of as maintenance activities but which nonetheless arise from un-scheduled events. For example, when users expect to be away from work for an extended period of time, they often implement an automatic notification feature of an e-mail suite that provides for an automated reply whenever an e-mail message is received in their inbox. The message may indicate that the recipients "will be out of the office for the next week". The problem associated with using this capability of e-mail suites during a normal workday is the burdensome nature of drafting the reply message and specifying the duration of absence. Users desire an automatic notification feature that can be launched with a minimum of aggravation and perhaps through a common means that also is used to launch opportunistic maintenance activities.

Thus, those skilled in the art desire methods and apparatus that provide an opportunistic maintenance capability. Such methods and apparatus would complement scheduled maintenance activities by allowing maintenance activities to be performed during time slots that occur opportunistically during a normal work day and at other times.

Those skilled in the art also desire methods and apparatus for performing maintenance activities that would initiate a maintenance activity only if it could be performed during the time period when the computer system user expected to be away from the computer system. Those skilled in the art want to avoid situations where a resource-intensive maintenance activity is still running when the user returns to use the computer system.

In addition, those skilled in the art desire methods and apparatus that prioritize maintenance activities to be performed during time slots that opportunistically occur during a workday according to the importance of the maintenance activity and the time required to perform the maintenance activity. In such methods and apparatus, higher priority tasks would be rejected in favor of lower priority tasks in determining which maintenance task to perform if the higher priority task could not be performed in the user-specified time period available for opportunistic system maintenance. In addition, there should be a way to reflect the urgencies of tasks. For example, if two tasks are both to be done weekly, but one was last done yesterday, and the other last done 6 days ago, the latter is more urgent.

Further, those skilled in the art desire methods and apparatus that would return the state of a computer system operating environment to that existing before opportunistic system maintenance was performed. Those skilled in the art do not want to have to re-establish an operating environment after maintenance was performed by, for example re-opening an application program. Those skilled in the art also want to avoid the even more burdensome situation of losing work as a result of maintenance activities.

Finally, those skilled in the art desire that methods and apparatus developed for implementing opportunistic computer system maintenance activities be modified to accommodate other computer system activities that can benefit from such "on the fly scheduling" capability.

SUMMARY OF THE PREFERRED EMBODIMENTS

A first embodiment of the present invention comprises a signal-bearing medium tangibly embodying a program of machine-readable instructions executable by a digital processing apparatus of a computer system to perform operations for controlling computer system actions, the operations comprising: receiving a command entered with an input device of the computer system to begin opportunistic computer system activities, where the command specifies a time period available for opportunistic computer system activities; and initiating at least one computer system action during the time period available for opportunistic computer system activities.

A second embodiment of the present invention comprises a signal-bearing medium tangibly embodying a program of machine-readable instructions executable by a digital processing apparatus of a computer system to perform operations for controlling computer system activities, the operations comprising: receiving a selection of at least two computer system actions to be performed opportunistically as time slots for opportunistic computer system activities arise; saving the at least two computer system actions to a list stored in a memory of the computer system; receiving a command to begin opportunistic computer system activities, where the command specifies a time period available for performing opportunistic computer system activities; selecting from the list at least one of the at least two computer system actions to be performed; and initiating the at least one computer system action.

A third embodiment of the present invention comprises a computer system having an ability to perform opportunistic computer system activities, the computer system comprising: at least one memory to store at least one program of machine-readable instructions, where the at least one program performs operations to control opportunistic computer system activities; at least one input device to initiate opportunistic computer system activities; and at least one processor coupled to the at least one memory and the at least one input device, where the at least one processor performs the following operations when the at least one program is executed: receiving a command entered with the at least one input device of the computer system to begin opportunistic computer system activities; receiving an identification of a time period available for performing opportunistic computer system activities; and initiating at least one computer system action during the time period identified as available for opportunistic computer system activities.

A fourth embodiment of the present invention comprises a signal-bearing medium tangibly embodying a program of machine-readable instructions executable by a digital processing apparatus of a computer system to perform operations for controlling computer system actions, the operations comprising: receiving a command entered with an input device of the computer system to disable scheduled computer system activities, where the command specifies a time period during which scheduled computer system activities will be disabled; and executing the command to disable scheduled computer system actions during the time period.

Thus it is seen that embodiments of the present invention overcome the limitations of the prior art. In particular, in the prior art, there often was no easy way to initiate computer system maintenance activities in an opportunistic manner during, for example, normal business hours. A computer system user would have to access the maintenance capability through a burdensome and time-consuming process of initiating multiple maintenance programs, selecting maintenance activities to be performed, and specifying the time to perform the maintenance activities. Such an approach relies on a manual scheduling paradigm and is not well suited to responding to unanticipated opportunities to perform maintenance activities that arise during a business day when a computer system user is, for example, away from the computer system.

In the prior art there is also no way to prioritize multiple maintenance activities both from the perspective of importance and from the perspective of time to perform the maintenance activities. For example, if a user knew beforehand that a higher priority maintenance activity could not be performed to completion during a time period the user expected to be away from the computer system, the user might elect to perform a lower priority maintenance activity that could, in fact, be performed to completion during the available period.

In contrast, the apparatus and methods of the present invention overcome the limitations of the prior art. In methods and apparatus of the present invention, a computer system user selects a group of maintenance activities to be performed when opportunities arise, and prioritizes them according to level of importance. Then, as opportunities for computer system maintenance occur, the user specifies the time available for performing opportunistic computer system maintenance with a few keystrokes or other user input actions that quickly indicate to the computer system that an opportunity for computer system maintenance has arisen, and the amount of time available for performing computer system maintenance. The computer system then performs the highest priority maintenance that can be completed in the identified time period. If there is time left over, the computer system performs the next-highest-priority maintenance task if it can be performed in the remaining time. The process continues until all maintenance tasks have been performed, or until there is insufficient time to perform any of the remaining tasks.

In addition, and in contrast to the prior art systems and methods, the present invention stores to memory the current state of a computer system operating environment before potentially state-destructive maintenance activities are performed. The "state" of a computer system may include which application programs were open; which documents or files were open; the exact appearance of the graphical user interface associated with the application program, etc. After the computer system maintenance activities have been performed, methods and apparatus of the present invention return the state of the computer system to that before the maintenance activity was performed. This provides a seamless transition between productivity periods and maintenance periods, allowing the computer system user to pickup where the user left off when the user returns to the computer system.

Further, the methods and apparatus of the present invention can be adapted for use to initiate other computer system actions in addition to maintenance activities. For example, computer systems are often used for notification purposes by users to inform others that a user expects to be away from the office for an extended period of time. Such functionality is desired in situations that opportunistically occur where, for example, a user unexpectedly has to be away from her computer system for a few hours. In methods and apparatus of the present invention, a computer system user can quickly initiate an instant message notification procedure that provides instant message responses to those seeking to correspond with computer system user when the computer system user is away from the computer system.

In conclusion, the foregoing summary of the preferred embodiments of the present invention is exemplary and non-limiting. For example, one of ordinary skill in the art will understand that one or more aspects or steps from one embodiment can be combined with one or more aspects or steps from another embodiment to create a new embodiment within the scope of the present invention.

BRIEF DESCRIPTION OF THE DRAWINGS

The foregoing and other aspects of these teachings are made more evident in the following Detailed Description of the Preferred Embodiments, when read in conjunction with the attached Drawing Figures, wherein.

DETAILED DESCRIPTION OF THE PREFERRED EMBODIMENTS

The present invention addresses the above-mentioned limitations of the prior art by introducing a system that allows a user of a computing device to conveniently specify a duration of time that he will be away from the computer so that maintenance tasks—such as virus scanning, disk defragmentation, adware removal, spyware removal, database encryption, file backup, database compaction or reorganization, computer reboot, reinstallation of operating system, killing tasks that are running, freeing memory, and updating of software patches or fixes to current software installed on the user's computer—can be performed during the time the user will be away. This specification is done with a single button and on-the-fly, just as a user is about to step away from his computing system. Thus the user can identify to the computer system time slots for performing opportunistic computer system maintenance activities. The opportunistic computer system maintenance activities will be comprised of one or more particular computer system maintenance tasks such as, for example, virus scanning, disk defragmentation, etc. in other embodiments of the present invention, the ability to perform computer system actions in an opportunistic manner may not involve maintenance activities; rather they may involve general activities like responding to e-mail or arming a theft-deterrent device.

Figure 1:
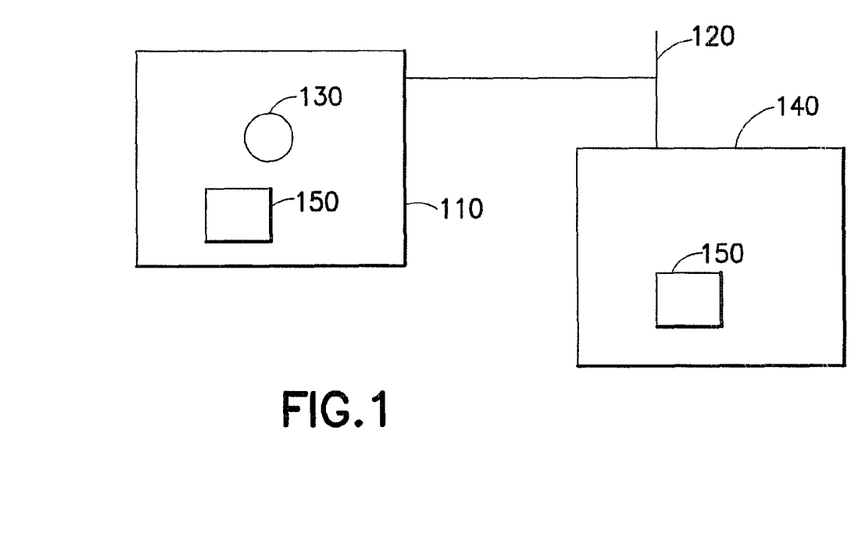
FIG. 1 is a block diagram depicting an embodiment of the present invention implementing on-the-fly, user-initiated maintenance task scheduling in accordance with the present invention.

FIG. 1 shows a computing system 110, such as a personal computer, with access to a network 120 such as a wireless or wired Ethernet. An "away button" 130 is available for specifying a period of time. For example, the away button 130 may be a physical button on the user's keyboard, mouse, CRT bezel, LCD bezel, or other convenient location. Alternatively, the away button 130 may be a nonphysical button such as an icon displayed on the computer screen in an interactive graphical user interface, such as an icon of a button displayed on the screen desktop, taskbar, start menu, or other display location. The functionality may also be available through a voice command, or other means which is appropriate to the system. The away button 130 may also be part of a key or dial already on the keyboard or mouse, and this specific "away function" can be triggered by interacting with the current key or dial in a specific way, such as holding the key down for a few seconds, using combinations of keys and dials (e.g., Alt-Shift-A, Alt-mouse dial, etc.). The amount of time the user plans to be away will be proportional to, for example, the amount of time a button is held depressed, the pressure applied in depressing the button, or the number of times in rapid succession that the button is pushed, etc. The amount of time implied need not have a linear relationship to the input. For example, one push might mean 15 minutes, two pushes 30 minutes, 3 pushes 1 hour, and 4 pushes 12 hours, and the user may set this relationship based on his preferences and habits.

This function may also be triggered by voice commands using a standard voice recognition system. A profile 150 may contain information useful for scheduling maintenance tasks and may reside on the local computer 110 or a remote computer 140 available to computer 110 over network 120. The remote computer 140 may be maintained by the user, a company, a service bureau, or third party.

Figure 2:
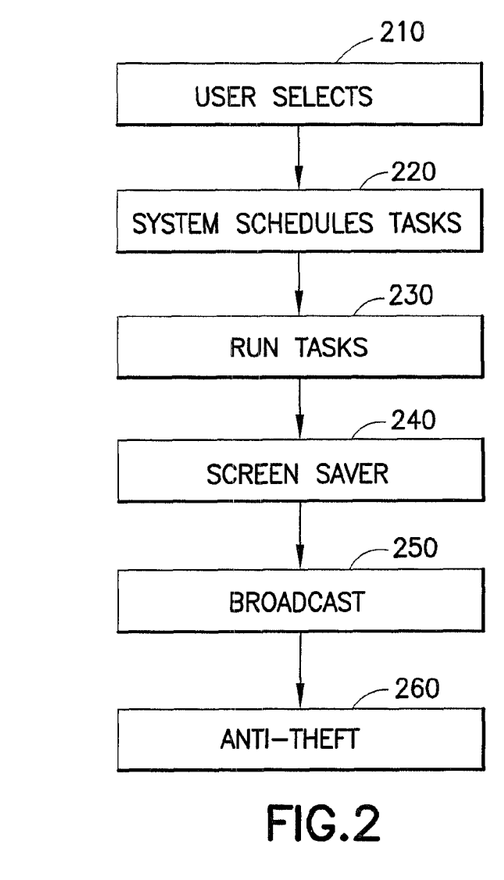
FIG. 2 is a flow chart depicting a method of triggering and performing on-the-fly, user-initiated maintenance task scheduling in accordance with the present invention; and accordance with the present invention.

FIG. 2 is a flow chart showing a mechanism for interacting with the away button and scheduling opportunistic maintenance activities during the specified "away" period. In step 210, the user uses the away button in such a way as to convey a duration of time that the user expects to be away from the computing system 110. For example, a user may be about to leave his office for lunch and wish to notify the computing system that he will be away. The user may press the away button to indicate half an hour, twice to indicate 1 hour, three times to indicate 1.5 hours, and so forth. Alternatively, a user may press and hold the away button, and the longer the away button is pressed, the greater the specification of away time. For an away button represented as an icon on a computer screen, the user may select the button using a mouse. Clicking the icon a number of times changes the specified away duration, or the user may indicate duration in any other conventional way. The user may get visual feedback as to the away time setting, for example by seeing the words "1 hour" or "2 hours" on the screen of a computing system 110. With a voice recognition system, the user may speak words such as, "Away button, I will be away for three hours" Or "I will be away until 3 pm." This specification of away duration is useful because it permits the computing system 110 to determine which computer system maintenance tasks and how many computer system maintenance tasks may be scheduled while the user is away from the system.

For example, if tasks are expected to take too much time and cannot fit into the specified away time, they may not be run until another time at which the user is away for a longer period of time. This away feature, in which a user actively and explicitly specifies intent to be away for a specific duration of time, is more useful than systems in which a system may predict or sense that a user is away because he user may return at anytime if intent is not expressed. For example, a system may use a sensor to determine that a user has left the computing device, but it would not be useful to start an antivirus program at this point, because the user may have just walked away from the computer for a few minutes before returning. If he returned in just a few minutes, he may be irritated that a long antivirus scan has started.

In step 220, the computing system 110 determines which tasks may be scheduled during the user-specified away time, which is specified by the user on-the-fly when the user is about to step away from computing system 110. To determine which tasks may be scheduled, the system may read a profile 150 stored on a file on the user's system 110 or on another system 140 available to system 110 over a network. For example, the profile may be stored on a remote computer 140 maintained by a company or service bureau. The profile, which contains a list of available maintenance tasks and anticipated times required for their running, is described in FIG. 3. For example, if the user has indicated he will be away from the computer for 3 hours, the system may determine that an antivirus program, which requires an expected time of half an hour to run, may be scheduled. These expected times may be determined in many ways and may be performed in step 220 or may be performed by other means and stored in profile 150. For example, the system 110 in step 220 may estimate that the antivirus program will take approximately 2 hours to run based on the number of files stored on a user's disk or by the time antivirus program required the last time it ran. Generally speaking, for example, the more files on a user's disk, the longer the antivirus scan will take. Of course, these durations may only be estimated, and the system may add a buffer time in case the computer system maintenance tasks actually require more time than anticipated. For example, the computer may include a buffer time of 15 minutes when deciding how many tasks to schedule during an away time. This buffer time may be set by the user or a third party.

In step 230, the computing system 110 runs the selected maintenance tasks that were determined in step 220. For example, using known operating system methods, the system may start an antivirus program followed by a database compaction program.

In step 240, the computing system 110 may optionally display a "screen saver" or other informative display that indicates the maintenance tasks running, the degree to which they have completed, or the time at which the user initiated the "away" period and when the user expects to return. Additionally, the display may provide informative messages, warnings, or instructions related to maintenance programs such as programs that detect spyware, adware, Trojan horses, keylogger and trackware components. Maintenance programs can also include tasks that move files and applications between computers. For example, the display may indicate how many viruses were found or that a virus could not be removed for some reason. This information can come from a communication from the maintenance program via a message. This display in step 240 may also be available on a remote computer, such as computer 140, so that progress and information may be monitored remotely. Computer 140, for example, could be a user's PDA, notebook computer, or other portable device that allows him to remotely monitor progress. Note that step 240 and 230 may be interchanged so that the screen saver or information screen is displayed before the computer system maintenance tasks are run.

In step 250, an away message with specified duration is optionally sent to other users who send e-mail or instant messages during the away time. For example, in step 210 the user may have pushed the away button three times, signifying an expected away time of 1.5 hours, and in step 250, the automatic away message is automatically set to "I will be away until 4 pm," and this is conveyed to people who send e-mail or instant messages to a user using software messages known in the prior art. The message may also be available to other users attempting to interact with the first user in various ways, such as by phone. Further, the user who sends an instant message might always receive an automatic response as shown, while the e-mail user would receive an automatic response only if the "away" duration is more than a user-specified amount of time, such 1 hour.

In step 260, the away button 130 optionally arms a theft-deterrence system. For example, certain models of IBM ThinkPad notebook computers contain an accelerometer to detect sudden motions to the hard drive. This may also be used to detect that a theft is occurring during an away time (if the computer senses motion) and thus initiate a suitable alarm. An alarm may be a sound or a theft message sent to a remote computer such as computer 140. Once the user returns to his computing system during normal use, he can disarm the alarm by various means, for example, by typing a password. Upon a suspected theft, the system may encrypt certain files or move them to a secure server 150 and then erase them.

Figure 3:
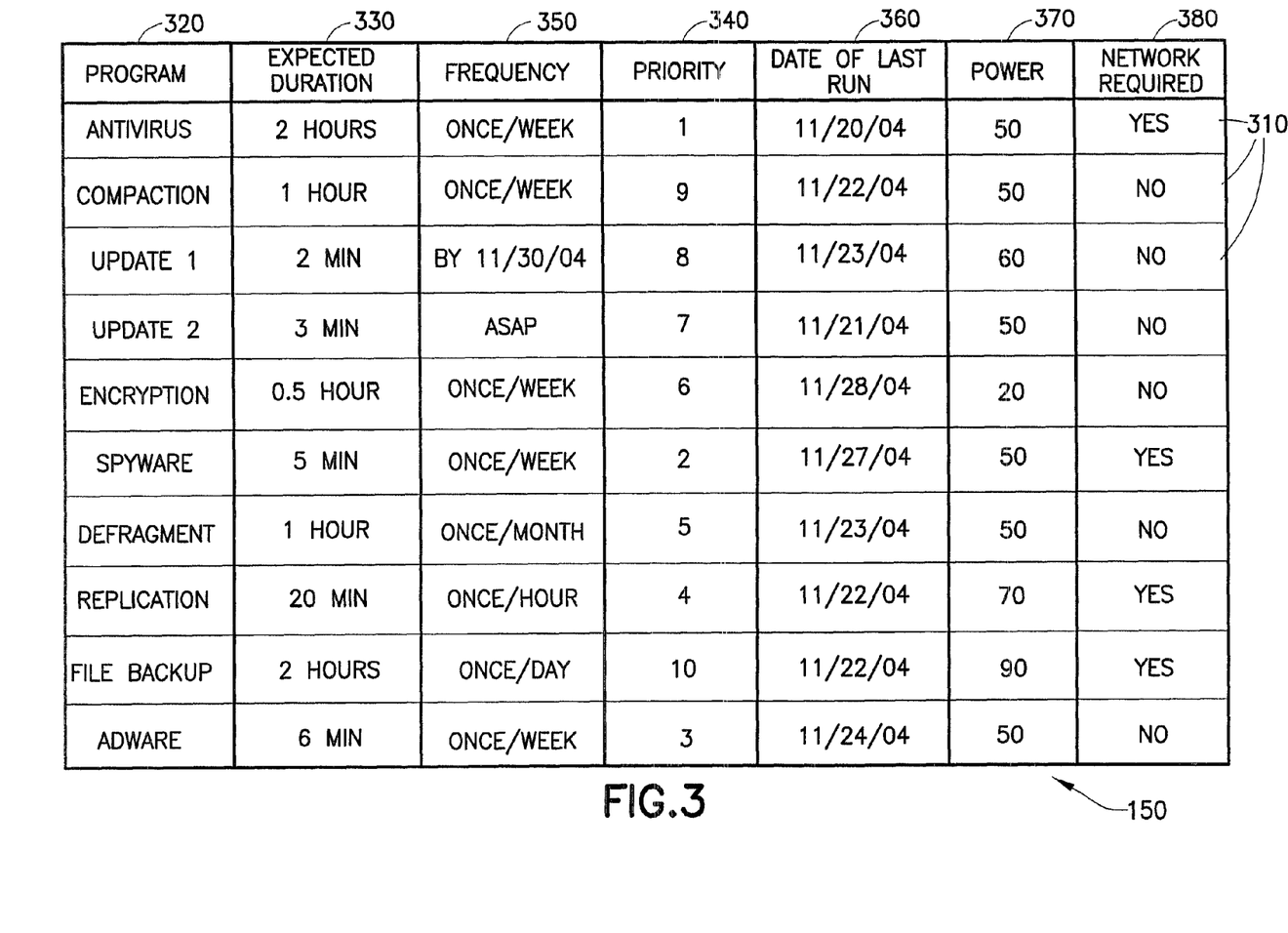

FIG. 3 is a representation of a profile 150, which is used by system 110 to determine which maintenance programs are run during the user-specified away time. Each record 310 of the file may contain such information as maintenance program name 320, expected running time 330 for the program, and priority 340 for the tasks. Priority indicates that running of one maintenance program may be more urgent or crucial than another. For example, it may be more urgent to run an antivirus program than an adware removal program because viruses may have a greater impact on a user, group of users, or company. These priorities 340 may be set by a user, group of users, government, a company, or third party. The priorities may change through time. For example, if the user ran antivirus software within the last twenty four hours, it may be of higher priority to install a software update at the current time. The dynamic nature of these priorities may be set manually by a user, group of users, or company, or determined automatically by the system which keeps track of the times and dates that a maintenance program 320 has run on a user's computer 230.

In contrast to priority, the maintenance task selected to be performed can also be selected on the basis of urgency. In one embodiment, "urgency" refers to the fact that the maintenance task selected was last performed in the most distant past when compared to other maintenance tasks. In other embodiments, "urgency" refers to the fact that the maintenance task selected will have the greatest impact on the quality of the operating condition of the computer system.

Entries in column 350 may indicate how often maintenance programs should typically run to keep a system healthy. For examples, antivirus programs may be run as close as possible to weekly intervals. Entries in column 360 may store the date the last time a maintenance program 320 was run. Entries in column 370 may be used to indicate which programs are to run or not run based on available battery power if the computer is being run on batteries. Thresholds may be indicated in this column, such as 10%, which may indicate that maintenance programs 320 should not be started if the expected power drain will take the system below 10%. Alternatively, these thresholds may be values at which a maintenance program should not be run. For example, if the current battery charge is only 50%, an antivirus program should not be scheduled in step 220. Entries in column 380 may be Yes or No, which indicate that a network connection is required to run each program, and that it should only be considered for scheduling if a network connection is available. For example, system updates are provided over the network and file backups require a network to a remote computer. In some cases, if no network is available, the system can do the "next best thing" such as backing up files to a second partition of the system's hard drive or running antivirus using a slightly out-of-date virus description file.

Using the system described herein, the user may specify, on-the-fly, that he expects to be away for a specified time, and the system ensures that by the time he returns, it is likely to have performed useful maintenance tasks. These tasks are many and varied and include database compaction, database reorganization, encryption, spyware scan, virus scan, adware scan, disk defragmentation, security compliance scan, downloading and installation of system updates, installation of new software, executing a portion of a distributed computation, file backup and moving files from computing system 110 to other computers. By providing a convenient button or similar interaction feature, it is likely that a user will not be delinquent in performing such maintenance tasks. The away time may be specified via hardware button, software button (e.g. on GUI taskbar), button on keyboard, button on CRT bezel, button on mouse, dial, slider or by spoken command. The user may specify the duration by any of various means, including: selecting a button several times, pressing button with increasing pressure, using a sequence of keyboard keys, using multiple keyboard keys simultaneously, voice input, turning a dial, moving a slider, holding a button for a specific amount of time, holding a button while an on-screen counter increments duration.

The system 110 may notify the user about which tasks may be scheduled in the time allotted, and the user may choose which of the tasks to run if they all cannot fit into the "away time." For example, during step 220, the system may display information from profile 150 so that the user may manually make selections about which tasks may be run during a specified away time. Such manual selections may be done using standard computer-user interaction techniques such as with a keyboard, mouse or voice recognition system.

Typically, a maintenance task 320 is run on the user's own computing system 110. However, the maintenance may be performed as a service by another computer, an IT shop in a company, a service bureau, or a third party. Thus, the CPU or components of a remote computer 140 may be used as a service to assist with maintenance activities to either speed the maintenance, impact the user's interactions to a lesser degree, or for other useful purposes.

Sometimes a user will return to the computing system 110 before the maintenance tasks 320 have actually been completed. In these instances, the user may conveniently stop such tasks. For example, if the user is returning and adware scanning has not completed, the user may press the away button to stop the scan. The away button thus sends a "stop" signal to the maintenance program 320 currently running.

The maintenance tasks (i.e. programs) 320 themselves may play a more active role in the task scheduling step 220. For example, the system 100 that implements the away button can broadcast a signal to the maintenance programs 320, informing them that a certain away time is available, and the maintenance tasks can determine if the time is sufficient for it to complete the task within the specified time. If sufficient time exists, a maintenance program 320 may send a signal back to the computing system 110 to inform it of this sufficiency. For example, each task may have access to its expected duration in profile 150 or actually write the information to profile 150. The maintenance software can register with the scheduler in step 220 that it has a need to perform deferred work.

During the user selection step 210, the unit of time referenced by a button push or "time-away" count is settable by the user. For example, each press of the away button may correspond to 10 minutes, half an hour, or an hour, and this time increment may be determined by a user, company or third party. The amount of time allocated to each step need not be the same. For example, the first push of the button could correspond to 25 minutes, but with each additional push of the button being 10 additional minutes, if this suits the user's habits.

In some cases, the maintenance tasks 320 may be run in parallel (simultaneously). This would be appropriate, for example, if one task is limited by the CPU and another is limited by disk accessing. An indication of this may be specified in profile 150 or by the user in step 210.

At times, the computing system 110 will not be connected to a stable power source such as an AC charger or electric outlet. In these cases, such as when a notebook computer is running on local batteries only, the scheduler in step 220 will not want to schedule as many tasks as it normally would if full power was available, because running the maintenance tasks drains power. Thus, the scheduling in step 220 takes into account the specified time duration of the away period and initiates a task if it is likely to complete the task in the specified time without draining battery resource below a threshold.

For example, if it is predicted that running antivirus program software for 2 hours will drain the battery below 10% of the full charge, the system will not schedule antivirus in step 220. An estimate of battery use and drain may be obtained by an examination of previous battery use during operation of the maintenance task or by other means.

The specified duration of time in step 210 may be negative, that is, the button functions as a "not away" button so that the system ensures that maintenance tasks are not performed during a specified time. In this capacity, the away button performs a "do not disturb" function for a specified duration of time. For example, the user may hold the "D" key down on the keyboard, while pressing the away button. This may indicate that the user is not to be disturbed by maintenance tasks 320 or other tasks for the next two hours. A message may be automatically sent to people sending e-mail or instant messages that the user is not to be disturbed until a certain time. Thus the away button may be used to set and send a do not disturb message with a particular duration of time.

In step 210, when the user is specifying an away duration or do not disturb duration, the system may check the user's calendar to see if the specified duration runs into an important meeting or other event that may affect the running of the away programs or the do not disturb function. For example, if the system checks the user's calendar and sees the user has a need to actively use the computing system during the specified time, the away feature will notify the user of this potential conflict.

Maintenance programs 320 may "register" with the away function of system 110 so that they can behave appropriately when the user goes away. For example, it may be important that updates not be run at the same time an antivirus is running, and this fact may be communicated to the away function performed by systems such as system 110.

The file in FIG. 3 may also specify a minimum frequency with which each task must be run, and this minimum frequency may override the scheduling when the away button is used or not used. For example, a company may institute a policy that requires antivirus tasks to run every week. In this case, if a user does not select the away button, the antivirus will be run one week after the previous time it was run.

During step 220, when computing system 110 is determining which tasks to schedule, additional information may augment the information shown in profile 150 or be included as part of profile 150. For example, the expected away time as explicitly conveyed by a user's pressing of an away button may be modified based on a user's past history of use or by detected inactivity of the computer. For example, if a user has a history of specifying he will be away for 1 hour during lunch times, but he is really away for 1.5 hours as determined by monitoring when a user returns to computing system 110 and begins using the system, the system 110 may determine that it can realistically schedule additional programs 320 then would fit into the allotted away time as specified by a user. The away feature may record a user's history of use, predicts user's likelihood of interrupting the away process, or predict likelihood of system having more or less time to perform maintenance activities during the away time. The specific algorithms and decisions concerning this may in turn be tempered by the difficulty or feasibility of stopping or suspending tasks once they have been initiated. For example, a process which, once started sometimes cannot be stopped until it is completed, or has a high time cost in terms of recovering from the initiated operation, and this may cause the system to be more cautious in assuming that the user will be away for longer than he asserts.

Thus it is seen that the foregoing description has provided by way of exemplary and non-limiting examples a full and informative description of the best method and apparatus presently contemplated by the inventors for performing computer system maintenance and notification activities in an opportunistic manner. One skilled in the art will appreciate that the various embodiments described herein can be practiced individually; in combination with one or more other embodiments described herein; or in combination with computer system maintenance methods and apparatus differing from those described herein. Further, one skilled in the art will appreciate that the present invention can be practiced by other than the described embodiments; that these described embodiments are presented for the purposes of illustration and not of limitation; and that the present invention is therefore limited only by the claims which follow.

We claim:

1. A non-transitory computer readable medium storing a program of machine-readable instructions executable by a digital processing apparatus of a computer system to perform operations for controlling computer system activities, the operations comprising:

receiving a command entered with an input device of the computer system to begin opportunistic computer system maintenance activities where the command specifies a time period available for opportunistic computer system maintenance activities; and initiating at least one computer system activity during the time period available for opportunistic computer system maintenance activities, where opportunistic computer system maintenance activities are initiated only if at least one pre-determined criterion is satisfied, where the opportunistic computer maintenance system activities comprise the at least one computer system activity that comprises at least one computer system maintenance task, the operations further comprising:

prior to initiating the at least one computer system activity, determining if the at least one pre-determined criterion is satisfied; and where the predetermined criterion concerns whether the time period identified as available for computer system maintenance activities is of sufficient duration to perform the at least one computer system maintenance activity, wherein the time period is identified by a user on the fly;

where determining if the at least one pre-determined criterion is satisfied comprises:

calculating an estimate of the amount of time necessary to perform the at least one computer system maintenance task to completion; and comparing the estimate to the time period identified as available for computer system maintenance activities, whereby the at least one computer system maintenance task is initiated only if there is sufficient time to perform the at least one computer system maintenance task to completion based on the comparison of the estimate and the time period identified as available for computer system maintenance activities.

2. The non-transitory computer readable medium of claim 1 where the operations further comprise:

after receiving the command to begin opportunistic computer system maintenance activities and prior to initiating the at least one computer system activity, retrieving a list of at least one computer system activity to be performed during periods for opportunistic computer system maintenance activities, where the list of at least one computer system activity was pre-loaded on the computer system along with an application program that performs the at least one computer system activity; and selecting the at least one computer system activity from the list.

3. The non-transitory computer readable medium of claim 1 where the operations further comprise:

prior to receiving the command entered with an input device of the computer system, receiving a designation of the at least one computer system activity, where the designation indicates that the at least one computer system activity can be performed during time periods available for opportunistic computer system maintenance activities; and saving the designation to a memory of the computer system.

4. The non-transitory computer readable medium of claim 1 where a duration of the time period is specified using at least one item selected from the following group: computer system button; graphical element incorporated in an interactive graphical user interface of the computer system; keyboard button; monitor button; mouse button; dial; slider; spoken command.

5. The non-transitory computer readable medium of claim 1 where a duration of the time period is specified by using at least one method selected from the following group: depressing a computer system button several times, where the amount of time is proportional to the number of times the computer system button is depressed; depressing a button with increasing pressure, where the amount of time is proportional to the pressure applied when depressing the button; using a sequence of keyboard buttons; using multiple keyboard buttons simultaneously; voice input; turning a dial; moving a slider, where the amount of time is proportional to a distance the slider is moved; holding a button depressed, where the amount of time is proportional to the time period the button is held depressed.

6. The non-transitory computer readable medium of claim 1 where the at least one computer system activity further comprises an automated electronic message response to incoming electronic messages where the automated electronic message response indicates an amount of time a user expects to be away from the computer system as specified by the time period in the command to initiate opportunistic computer system maintenance activities.

7. The non-transitory computer readable medium of claim 6 where the automated electronic message response comprises at least one selected from the following group: an automated e-mail response; an automated instant messaging response; an automated telephone message response.

8. The non-transitory computer readable medium of claim 1 where the at least one computer system activity further comprises performance of a distributed computation.

9. The non-transitory computer readable medium of claim 1 where the at least one computer system maintenance task is selected from the following group: virus scanning; disk defragmentation; adware removal; spyware removal; database encryption; file backup; database compaction; database reorganization; computer reboot; ending running tasks; reinstallation of an application program; repair of an application program installation; reinstallation of an operating system; repair of an operating system installation.

10. The non-transitory computer readable medium of claim 1 where the amount of time necessary to perform the at least one computer system maintenance task is determined by a bandwidth of a computer system resource available to the computer system.

11. The non-transitory computer readable medium of claim 10 where the computer system resource is a network connection.

12. The non-transitory computer readable medium of claim 1 where the operations further comprise:
- prior to the initiation of the at least one computer system maintenance task, saving information concerning at least a portion of the state of the computer system to computer system memory not affected by the at least one computer system maintenance task;
- completing the at least one computer system maintenance task;
- retrieving the information concerning at least a portion of the state of the computer system prior to the initiation of the at least one computer system maintenance task; and
- restoring the state of the computer system to that prior to the performance of the at least one computer system maintenance task as reflected in the information.

13. The non-transitory computer readable medium of claim 1 where the operations further comprise:
- prior to the initiation of the at least one computer system maintenance task, saving information concerning at least a portion of the state of the computer system to computer system memory not affected by the at least one computer system maintenance task;
- receiving a command to stop the at least one computer system maintenance task before it is completed;
- retrieving the information concerning at least a portion of the state of the computer system prior to the initiation of the at least one computer system maintenance task; and
- restoring the state of the computer system to that prior to the performance of the at least one computer system maintenance task as reflected in the information.

14. The non-transitory computer readable medium of claim 1 where the computer system is powered by at least one battery and where the at least one pre-determined criterion further concerns the maintenance of a minimum charge state desired for the at least one battery, and where determining if the at least one pre-determined criterion is satisfied further comprises:
- calculating an estimate of the charge state of the at least one battery after the at least one computer system maintenance task is performed to completion;
- comparing the estimate of the charge state to the minimum charge state desired for the at least one battery,
- whereby the at least one computer system maintenance task is initiated only if there will be a minimum charge remaining in the at least one battery equal to or greater than the desired minimum charge state based on the comparison of estimated of the charge state of the at least one battery after the at least one computer system maintenance task is performed to completion and the desired minimum charge state.

15. The non-transitory computer readable medium of claim 1 where the at least one pre-determined criterion concerns whether there is sufficient time to perform the at least one computer system maintenance task to completion and where determining if the at least one pre-determined criterion is satisfied comprises:
- calculating an estimate of time available for computer system maintenance activities based on historic patterns of use of the computer system by a user;
- calculating an estimate of an amount of time necessary to perform the at least one computer system maintenance task to completion; and
- comparing the estimate of the time available for computer system maintenance activities and the estimate of the amount of time necessary to perform the at least one computer system maintenance task to completion,
- whereby the at least one computer system maintenance task is initiated only if there is sufficient time to perform the at least one computer system maintenance task to completion based on the comparison of the estimates.

16. A non-transitory computer readable medium storing a program of machine-readable instructions executable by a digital processing apparatus of a computer system to perform operations for controlling computer system activities, the operations comprising:
- receiving a selection of at least two computer system activities to be performed opportunistically as time slots for opportunistic computer system maintenance activities arise;
- saving the at least two computer system activities to a list stored in a memory of the computer system;
- receiving a command to begin opportunistic computer system maintenance activities, where the command specifies a time period available for performing opportunistic computer system maintenance activities, wherein the time period is identified by a user on the fly;
- selecting from the list at least one of the at least two computer system activities to be performed during the time period available for opportunistic computer system maintenance activities; and
- initiating the at least one computer system activity, where opportunistic computer system maintenance activities are initiated only if at least one pre-determined criterion is satisfied, where the opportunistic computer maintenance system activities comprise the at least one computer system activity that comprises at least one computer system maintenance task, the operations further comprising:
- prior to initiating the at least one computer system activity, determining if the at least one pre-determined criterion is satisfied; and
- where the predetermined criterion concerns whether the time period identified as available for computer system maintenance activities is of sufficient duration to perform the at least one computer system maintenance activity;
- where determining if the at least one pre-determined criterion is satisfied comprises:
- calculating an estimate of the amount of time necessary to perform the at least one computer system maintenance task to completion; and
- comparing the estimate to the time period identified as available for computer system maintenance activities,
- whereby the at least one computer system maintenance task is initiated only if there is sufficient time to perform the at least one computer system maintenance task to completion based on the comparison of the estimate and the time period identified as available for computer system maintenance activities.

17. The non-transitory computer readable medium of claim 16 where the selection received of the at least two computer system activities to be performed opportunistically is user-specified.

18. The non-transitory computer readable medium of claim 16 where the selection received of the at least two computer system activities to be performed opportunistically is made when at least one application program capable of performing the at least two computer system activities is loaded into a memory of the computer system.

19. The non-transitory computer readable medium of claim 16 where selecting from the list which of the at least two computer system activities to be performed is done according to at least one pre-determined criterion.

20. The non-transitory computer readable medium of claim 19 where the operations further comprise:
receiving a selection of a priority to be applied to each of the at least two computer system activities, wherein the priorities assigned to each of the at least two computer system activities will determine the order in which the computer system activities are performed; and
saving the priority selection to the list.

21. The non-transitory computer readable medium of claim 20 where the at least one predetermined criterion concerns selecting the highest-priority computer system activity to be performed first whenever opportunistic computer system maintenance activities are initiated.

22. The non-transitory computer readable medium of claim 20 where the at least one pre-determined criterion further comprises selecting the highest-priority computer system activity to be performed first only if the time period specified as being available for performing opportunistic computer system maintenance activities is of sufficient duration to perform the highest-priority computer system activity to completion.

23. The non-transitory computer readable medium of claim 22 where selecting from the list at least one of the at least two computer system activities to be performed further comprises:
calculating an estimate of the amount time necessary to perform the highest priority computer system activity to completion;
comparing the estimate to the time period available to perform opportunistic computer system maintenance activities;
whereby the computer system activity having the highest priority is only initiated if the comparison of the estimate and the time period available indicates that the highest priority computer system activity can be performed to completion.

24. The non-transitory computer readable medium of claim 23 where if there is insufficient time to perform the highest priority computer system activity, selecting from the list at least one of the at least two computer system activity to be performed further comprises:
selecting the computer system activity having the next highest priority;
calculating an estimate of the amount time necessary to perform the computer system activity having the next highest priority to completion;
comparing the estimate to the time period available to perform opportunistic computer system maintenance activities;
whereby the computer system activity having the next highest priority is initiated only if the comparison of the estimate and the time period available indicates that the next highest priority computer system activity can be performed to completion.

25. The non-transitory computer readable medium of claim 19 where the predetermined criterion comprises selecting the at least one computer system activity having a highest urgency.

26. The non-transitory computer readable medium of claim 25 where urgency depends upon an amount of time since a computer system activity was last performed, whereby the at least one computer system activity selected to be performed as having the highest urgency was last performed in the most distant past when compared to any other computer system activity.

27. The non-transitory computer readable medium of claim 25 where urgency depends upon the operating condition of the computer system, whereby the at least one computer system activity selected to be performed as having the highest urgency will have the greatest impact in improving the operating condition of the computer system.

28. The non-transitory computer readable medium of claim 19 where the predetermined criterion concerns computer system resources available to the computer system for performing one of the at least two computer system activities.

29. The non-transitory computer readable medium of claim 16 where selecting from the list at least one of the at least two computer system activities to be performed further comprises:
after receiving a command to begin opportunistic computer system maintenance activities, displaying a graphical user interface indicating the computer system activities included in the list of computer system activities that can be performed on an opportunistic basis; and
receiving a user input corresponding to a selection of at least one computer system activity to be performed during the period for opportunistic computer system maintenance activities identified by the command to initiate opportunistic computer system maintenance activities.

30. The non-transitory computer readable medium of claim 29 where the graphical user interface displays the time identified to perform opportunistic computer system maintenance activities and the time estimated to perform to completion each of the computer system activities included in the list of computer system activities that may be performed on an opportunistic basis.

31. The non-transitory computer readable medium of claim 16 where computer system activities comprise computer system maintenance tasks.

32. The non-transitory computer readable medium of claim 31 where the computer system maintenance task is selected from the following group: virus scanning; disk defragmentation; adware removal; spyware removal; database encryption; file backup; database compaction; database reorganization; computer reboot; ending running tasks; reinstallation of an application program; repair of an application program installation; reinstallation of an operating system; repair of an operating system installation.

33. The non-transitory computer readable medium of claim 16 where selecting from the list at least one further comprises selecting at least two computer system activities to be performed during the time period available for opportunistic computer system maintenance activities and where initiating the at least one computer system activity further comprises initiating the at least two computer system activities, whereby the at least two computer system activities are performed simultaneously.

34. A computer system having an ability to perform opportunistic computer system maintenance activities, the computer system comprising:
at least one memory to store at least one program of machine-readable instructions, where the at least one program performs operations to control opportunistic computer system maintenance activities;
at least one input device to initiate opportunistic computer system maintenance activities; and
at least one processor coupled to the at least one memory and the at least one input device, where the at least one processor performs the following operations when the at least one program is executed:

receiving a command entered with the at least one input device of the computer system to begin opportunistic computer system maintenance activities;

receiving an identification of a time period available for performing opportunistic computer system maintenance activities, wherein the time period is identified by a user on the fly; and initiating at least one computer system activity during the time period identified as available for opportunistic computer system maintenance activities, where opportunistic computer system maintenance activities are initiated only if at least one pre-determined criterion is satisfied, where the opportunistic computer maintenance system activities comprise the at least one computer system activity that comprises at least one computer system maintenance task, the operations further comprising:

prior to initiating the at least one computer system activity, determining if the at least one pre-determined criterion is satisfied; and where the predetermined criterion concerns whether the time period identified as available for computer system maintenance activities is of sufficient duration to perform the at least one computer system maintenance activity;

where determining if the at least one pre-determined criterion is satisfied comprises:

calculating an estimate of the amount of time necessary to perform the at least one computer system maintenance task to completion; and comparing the estimate to the time period identified as available for computer system maintenance activities, whereby the at least one computer system maintenance task is initiated only if there is sufficient time to perform the at least one computer system maintenance task to completion based on the comparison of the estimate and the time period identified as available for computer system maintenance activities.

35. The computer system of claim 34 where the at least one input device is selected from the following group: computer system button; graphical element incorporated in an interactive graphical user interface of the computer system; keyboard button; monitor button; mouse button; dial; slider; spoken command input device.

36. The computer system of claim 34 where the identification of a time period available for performing opportunistic computer system maintenance activities is received from the at least one input device.

37. The computer system of claim 34 where the identification of a time period available for performing opportunistic computer system maintenance activities is received from an associated computer system process that estimates the time period available for opportunistic computer system maintenance activities based on historic patterns of use of the computer system by a user.

38. The computer system of claim 34 where the operations further comprise:

after receiving the command entered with the at least one input device to begin opportunistic computer system maintenance activities and prior to initiating the at least one computer system activity, retrieving a list of at least one computer system activity to be performed during periods for opportunistic computer system maintenance activities, where the list of at least one computer system activity was pre-loaded on the computer system along with an application program that performs the at least one computer system activity; and selecting the at least one computer system activity from the list.

39. The computer system of claim 34 where the operations further comprise:

prior to receiving the command entered with the at least one input device, receiving a designation of the at least one computer system activity, where the designation indicates that the at least one computer system activity can be performed during time periods available for opportunistic computer system maintenance activities; and saving the designation to the at least one memory.

40. The computer system of claim 34 where a duration of the time period is specified by using at least one method selected from the following group: depressing a computer system button several times, where the amount of time is proportional to the number of times the computer system button is depressed; depressing a button with increasing pressure, where the amount of time is proportional to the pressure applied when depressing the button; using a sequence of keyboard buttons; using multiple keyboard buttons simultaneously; voice input; turning a dial; moving a slider, where the amount of time is proportional to a distance the slider is moved; and holding a button depressed, where the amount of time is proportional to the time period the button is held depressed.

41. The computer system of claim 34 where the at least one computer system activity further comprises an automated electronic message response to incoming electronic messages where the automated electronic message response indicates an amount of time a user expects to be away from the computer system as specified by the time period in the command to initiate opportunistic computer system maintenance activities.

42. The computer system of claim 34 where the at least one computer system maintenance task is selected from the following group: virus scanning; disk defragmentation; adware removal; spyware removal; database encryption; file backup; database compaction; database reorganization; computer reboot; ending running tasks; reinstallation of an application program; repair of an application program installation; reinstallation of an operating system; repair of an operating system installation.

43. The computer system of claim 34 where the amount of time necessary to perform the at least one computer system maintenance task is determined by a bandwidth of a computer system resource available to the computer system.

\* \* \* \* \*